US012352072B2

(12) United States Patent
Aycock

(10) Patent No.: US 12,352,072 B2
(45) Date of Patent: Jul. 8, 2025

(54) ADJUSTABLE APPLIANCE DOOR HANDLE

(71) Applicant: Megan Aycock, Jacksonville, FL (US)

(72) Inventor: Megan Aycock, Jacksonville, FL (US)

( * ) Notice: Subject to any disclaimer, the term of this patent is extended or adjusted under 35 U.S.C. 154(b) by 78 days.

(21) Appl. No.: 18/358,279

(22) Filed: Jul. 25, 2023

(65) Prior Publication Data

US 2024/0026706 A1 Jan. 25, 2024

Related U.S. Application Data

(60) Provisional application No. 63/369,305, filed on Jul. 25, 2022.

(51) Int. Cl.
*E05B 1/00* (2006.01)
*F25D 23/02* (2006.01)

(52) U.S. Cl.
CPC .......... *E05B 1/0015* (2013.01); *F25D 23/028* (2013.01)

(58) Field of Classification Search
CPC ......... Y10T 29/49826; Y10T 29/49876; Y10T 29/49947; Y10T 29/49948; Y10T 29/49963; Y10T 292/57; A47B 95/02; A47B 2095/023; E05B 1/00; E05B 1/0015; E05B 1/0053; E05B 1/028; E05B 85/10; E05B 79/06; F25D 23/02; F25D 23/028; F25D 2400/06; E05Y 2600/46; E05Y 2900/31
See application file for complete search history.

(56) References Cited

U.S. PATENT DOCUMENTS

| | | | | |
|---|---|---|---|---|
| 2,580,909 A | | 1/1952 | Gordon | |
| 2,961,694 A | | 11/1960 | May | |
| 3,017,657 A | | 1/1962 | Mills | |
| 4,912,809 A | | 4/1990 | Scheuer | |
| 4,979,713 A | * | 12/1990 | Bell | A47K 10/10 248/221.11 |
| 5,144,718 A | | 9/1992 | Ozawa | |
| 6,113,045 A | * | 9/2000 | Kuo | A47K 10/10 248/224.7 |
| 6,244,549 B1 | * | 6/2001 | Ching | A47B 96/028 248/251 |
| 6,932,328 B2 | * | 8/2005 | Shreiner | E04F 11/1804 403/348 |
| 7,640,630 B2 | | 1/2010 | Lee | |

(Continued)

FOREIGN PATENT DOCUMENTS

| | | | | |
|---|---|---|---|---|
| DE | 29611009 U1 | * | 8/1996 | E04F 11/1804 |
| DE | 10259328 A1 | * | 7/2003 | E05B 1/0015 |

(Continued)

*Primary Examiner* — Chuck Y Mah
(74) *Attorney, Agent, or Firm* — Mark Young, PA

(57) ABSTRACT

An appliance door handle includes a bar and at least one, e.g., a pair, of bracket assemblies. Each bracket assembly engages the bar and may be moved, i.e., located and fixed at a determined position along the length of the bar. The bracket assembly may be set (fixed) at positions on the bar that are suitable for engaging and mating with mounting lugs or adapters that protrude from a door. Each bracket assembly is configured to engage and mate with various appliance door handle mounting lugs or adapter. The adapter may be installed or removed to facilitate engaging and mating with a particular appliance door handle mounting lug or a particular door.

17 Claims, 22 Drawing Sheets

(56) References Cited

U.S. PATENT DOCUMENTS

| | | | | |
|---|---|---|---|---|
| 7,992,257 | B2 * | 8/2011 | Kim | F25D 23/028 16/412 |
| 8,523,126 | B2 | 9/2013 | Garrels et al. | |
| 11,006,786 | B1 * | 5/2021 | Daniels | A47K 10/10 |
| 2002/0104946 | A1 * | 8/2002 | Lai | A47K 10/04 248/224.7 |
| 2005/0066479 | A1 * | 3/2005 | Kim | F25D 23/028 16/436 |
| 2006/0200948 | A1 * | 9/2006 | Steurer | F25D 23/028 16/412 |
| 2008/0295291 | A1 * | 12/2008 | Lee | F25D 23/028 16/412 |
| 2012/0145854 | A1 * | 6/2012 | Smith | A47K 10/10 248/231.91 |
| 2016/0084567 | A1 | 3/2016 | Fernandez et al. | |
| 2018/0340348 | A1 | 11/2018 | Simon | |
| 2022/0381503 | A1 * | 12/2022 | Allgeier | F25D 23/028 |

FOREIGN PATENT DOCUMENTS

| | | | | |
|---|---|---|---|---|
| DE | 202012007098 | U1 * | 12/2013 | E05B 63/0017 |
| EP | 1736618 | A2 | 12/2006 | |
| FR | 3042809 | A1 | 4/2017 | |
| GB | 433085 | A | 8/1935 | |
| GB | 547659 | A | 9/1942 | |
| GB | 582577 | A | 11/1946 | |

* cited by examiner

ADJUSTABLE APPLIANCE DOOR HANDLE

RELATED APPLICATIONS

This application is a nonprovisional application and claims the benefit of priority of U.S. provisional application No. 63/369,305 filed Jul. 25, 2023, the entire contents of which are incorporated herein by this reference.

FIELD OF THE INVENTION

This invention relates generally to appliances, and, more typically, handles for doors of appliances, such as refrigerators, of the type used in residences.

BACKGROUND OF THE INVENTION

Handles provided on appliances, such as refrigerator doors, facilitate opening and closing. Modern refrigerators include handles of fixed length. Such fixed length handles are not suitable for replacing handles of a different length on a different make or model refrigerator.

Modern appliance (e.g., refrigerator) door handles attach to lugs that protrude from doors. Some manufacturers refer to such protruding hardware as studs. The term lug is used herein to broadly refer to any such protruding hardware, including a stud and a lug. Typically, a pair of spaced apart lugs is provided for each handle. The handle includes brackets that are specifically configured to mate with the lugs. The brackets are fixed on the handle. The position of the bracket relative to the handle cannot be changed. The brackets are configured to mate with only the specific lugs for the refrigerator. The brackets are not configured to mate with other shapes and sizes of lugs for other refrigerators.

Appliance door handles are prominent. Replacing handles with different style handles could improve the aesthetics of an appliance. However, in many cases, only original equipment handles or a limited range of handles available from the same manufacturer will fit the appliance. Such replacement handles tend to have the same appearance as the original equipment handle, except that a new replacement handle may be shiny and unmarred.

An easy and popular way to give a kitchen a makeover without breaking a budget is to update hardware. Upgrading a kitchen cabinets' hardware is an inexpensive and simple move for a refresh without a ton of labor or time involved. Countless options exist for handles and knobs of cabinets. Unfortunately, when it comes to appliance, e.g., refrigerator door, handles, the most prominent hardware in a kitchen, a dearth of options exist. Most consumers are relegated to original equipment handles for their appliance. Such handles may seem outdated or clash with stylish new cabinet hardware.

What is needed is a handle adapted to fit a wide range of appliances of various makes and models. The handle should have adjustable brackets to mate with lugs that may be various distances apart, depending upon the make and model of the appliance. The handle should have brackets that can be configured to mate with various lug sizes, shapes and configurations. The handle should be able to mate with flat planar doors and doors having a contour.

The invention is directed to overcoming one or more of the problems and solving one or more of the needs as set forth above.

SUMMARY OF THE INVENTION

To solve one or more of the problems set forth above, in an exemplary implementation of the invention, an appliance door handle includes a bar and at least one (e.g., a pair) of bracket assemblies. For purposes of illustration, the appliance may be a refrigerator. However, the principles of the invention are not limited to use with a refrigerator. Other appliances, such as, but not limited to, ovens, dishwashers, cabinets, drawers may benefit from a handle according to principles of the invention and are intended to come within the scope of the invention.

Each bracket assembly engages the bar and may be moved, i.e., located and fixed at a determined position along the length of the bar. The bracket assemblies may be set (fixed) at positions on the bar that are suitable for engaging and mating with mounting lugs and/or adapters that protrude from an appliance door. Each bracket assembly is configured to engage and mate with various appliance door handle mounting lugs and/or adapters. An adapter may be installed or removed to facilitate engaging and mating with a particular appliance door handle mounting lug. An adapter may be mechanically fastened to a door to provide a structure that the bracket can securely engage.

To the extent a door does not include mounting lugs, one or more mounting lugs may be attached to the door. Thus, mounting lugs may be original equipment or an added component for use with the invention.

In one exemplary embodiment, an adjustable appliance door handle includes an elongate bar having a first section extending from a first end of the bar and a second section extending from a second section of the bar. The bar may have a circular or non-circular cross-section shape. The first section and the second section have the same cross-sectional shape and size. At least one bracket is provided. In one embodiment two brackets are provided. However, a handle according to principles of the invention may work with one or more brackets. Each bracket includes a body and a bar channel extending through the body from a first side of the body to an opposite second side of the body. The bar channel is sized and shaped to receive a portion of either the first section and the second section of the bar. Until the bracket is secured to the bar with a set screw, the bar (an in particular either the first section or the second section of the bar, whichever is received in the bracket) is movable through the bar channel and relative to the body of the bracket. A mounting compartment is provided in each bracket. The mounting compartment is a cavity in a third side of the body of the bracket shaped and sized to engage a first type of appliance door handle mounting lug.

An adapter is provided to engage a second type of appliance door handle mounting lug. The adapter is a structure sized and shaped to be engaged within and removable from the primary lug compartment. The adapter includes a secondary lug compartment with a secondary aperture for receiving and engaging the second type of appliance door handle mounting lug that has a size that is different from a size of the first type of appliance door handle mounting lug. By way of example, the adapter may be hollow, have a rectangular cuboid shape, and be formed from bent sheet metal. The secondary aperture may be circular.

Threaded channels for set screws are provided in the body of each bracket. One set screw secures the bracket to the bar. The other set screw secures the bracket to a lug. By way of example, each bracket of the at least one bracket may include a first threaded channel extending from the cavity of the primary lug compartment, through the body, to the bar channel. A first set screw may be threadedly received in the first threaded channel. The first set screw secures the bracket to the bar when a portion of the set screw extends into the bar channel and abuts the bar. The adapter may include a first access aperture aligned with the secondary aperture and the first threaded channel when the adapter is engaged within the primary lug compartment.

Additionally, each bracket may include a second threaded channel extending from a side of the body, through the body, to the cavity of the primary lug compartment. A second set screw may be threadedly received in the second threaded channel. The second set screw secures the bracket to a lug when a portion of the set screw extends into the cavity of the mounting compartment and abuts the lug. A second access aperture may be aligned with the second threaded channel when the adapter is engaged within the primary lug compartment.

In one implementation, the brackets engage the first type of appliance door handle mounting lug using the primary lug compartment. In such an implementation, the adapter may be removed/omitted from the primary lug compartment. The mounting compartment engages one of the pair of appliance door handle mounting lugs protruding from an appliance door. A set screw secures the engaged lug to the bracket.

In another implementation, the brackets engage the second type of appliance door handle mounting lug using the adapter in the primary lug compartment. In such an implementation, the adapter is contained in the primary lug compartment. The secondary lug compartment receives one of the pair of appliance door handle mounting lugs protruding from an appliance door. A set screw secures the engaged lug to the bracket and adapter.

A handle according to principles of the invention is versatile. A bracket for a handle according to principles of the invention may engage an original equipment lug or an added aftermarket lug attached to a door, without an adapter. A bracket for a handle according to principles of the invention may also engage an adapter while the adapter engages an original equipment or aftermarket lug attached to a door. In that case, the adapter serves as an interface between the lug and the bracket. A bracket for a handle according to principles of the invention may also engage an adapter attached (e.g., screwed or bolted) directly to a door, without a lug.

The principles of the invention are not limited to handles for appliance doors. A handle according to principles of the invention is scalable and may be applied to devices other than refrigerators. By way of example and not limitation, a handle according to principles of the invention may be applied to drawers and cabinet doors of a kitchen, to other appliances such as ovens (i.e., to oven doors) and to any surface that requires a handle and to which handle mounting lugs may be attached.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An appliance door handle according to principles of the invention includes a bar and a pair of bracket assemblies. Each bracket assembly engages the bar and may be moved, located and fixed at a determined position along the length of the bar. The bracket assemblies may be set (fixed) at positions on the bar that are suitable for engaging and mating with lugs on an appliance door. Each bracket assembly is configured to engage and mate with various appliance door handle mounting lugs. An adapter, which is part of each bracket assembly, may be installed or removed to facilitate engaging and mating with a particular appliance door handle mounting lug.

Figure 1:
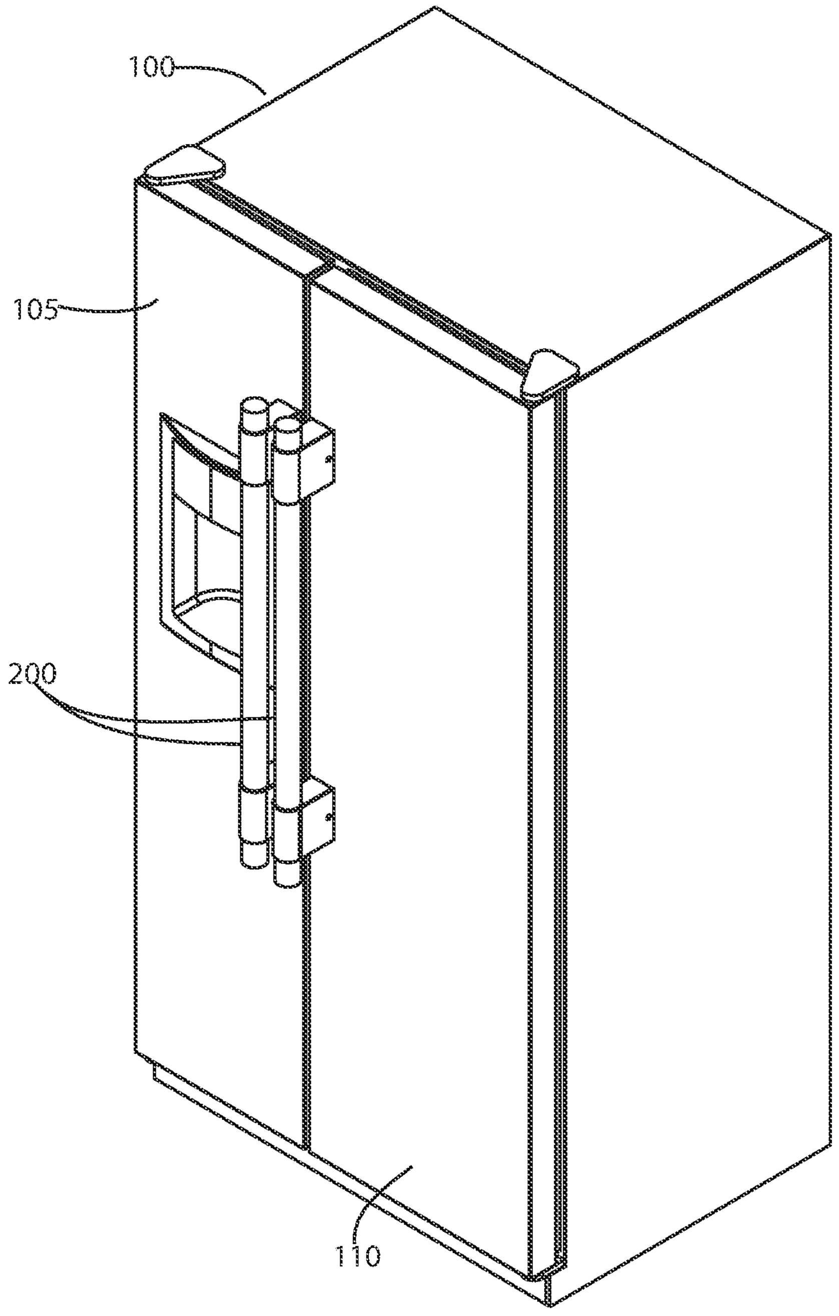
FIG. 1 is a perspective view of an exemplary appliance with exemplary adjustable appliance handles according to principles of the invention.
Figure 4:
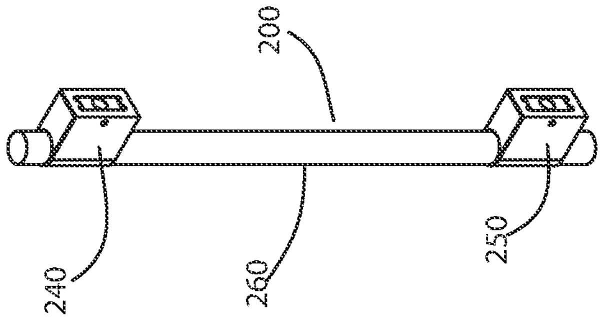
FIG. 4 is another perspective view of an exemplary adjustable appliance handle assembly according to principles of the invention.
Figure 3:
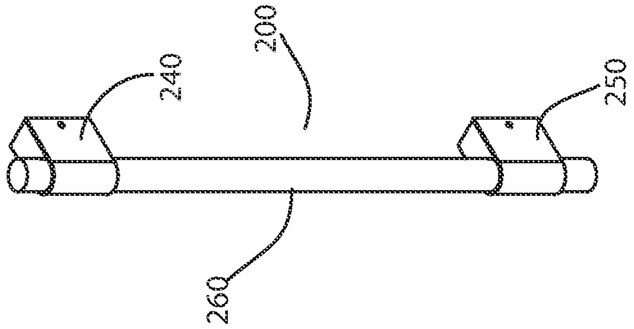
FIG. 3 is a perspective view of an exemplary adjustable appliance handle assembly according to principles of the invention.
Figure 2:
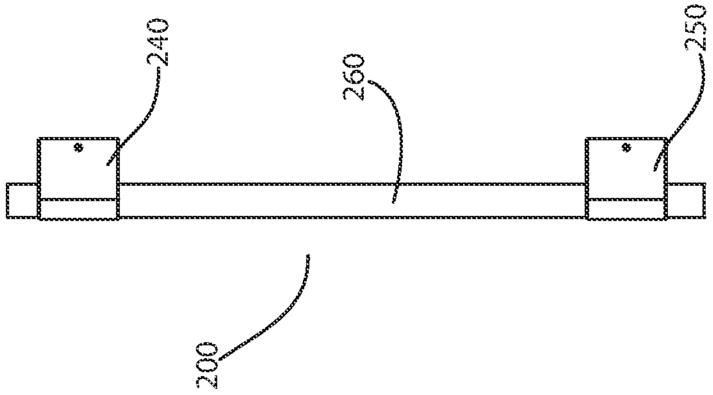
FIG. 2 is a side view of an exemplary adjustable appliance handle assembly according to principles of the invention.
Figure 5:
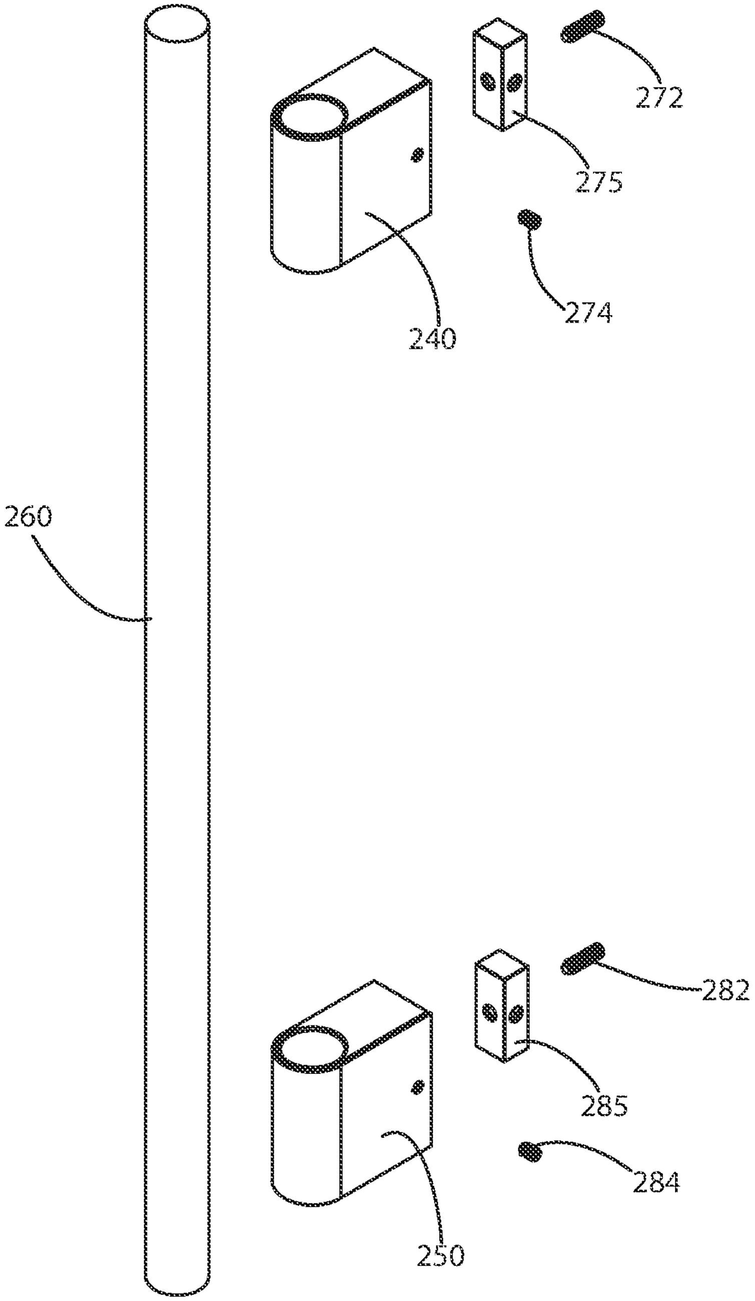
FIG. 5 is an exploded perspective view of an exemplary adjustable appliance handles according to principles of the invention.
Figure 6:
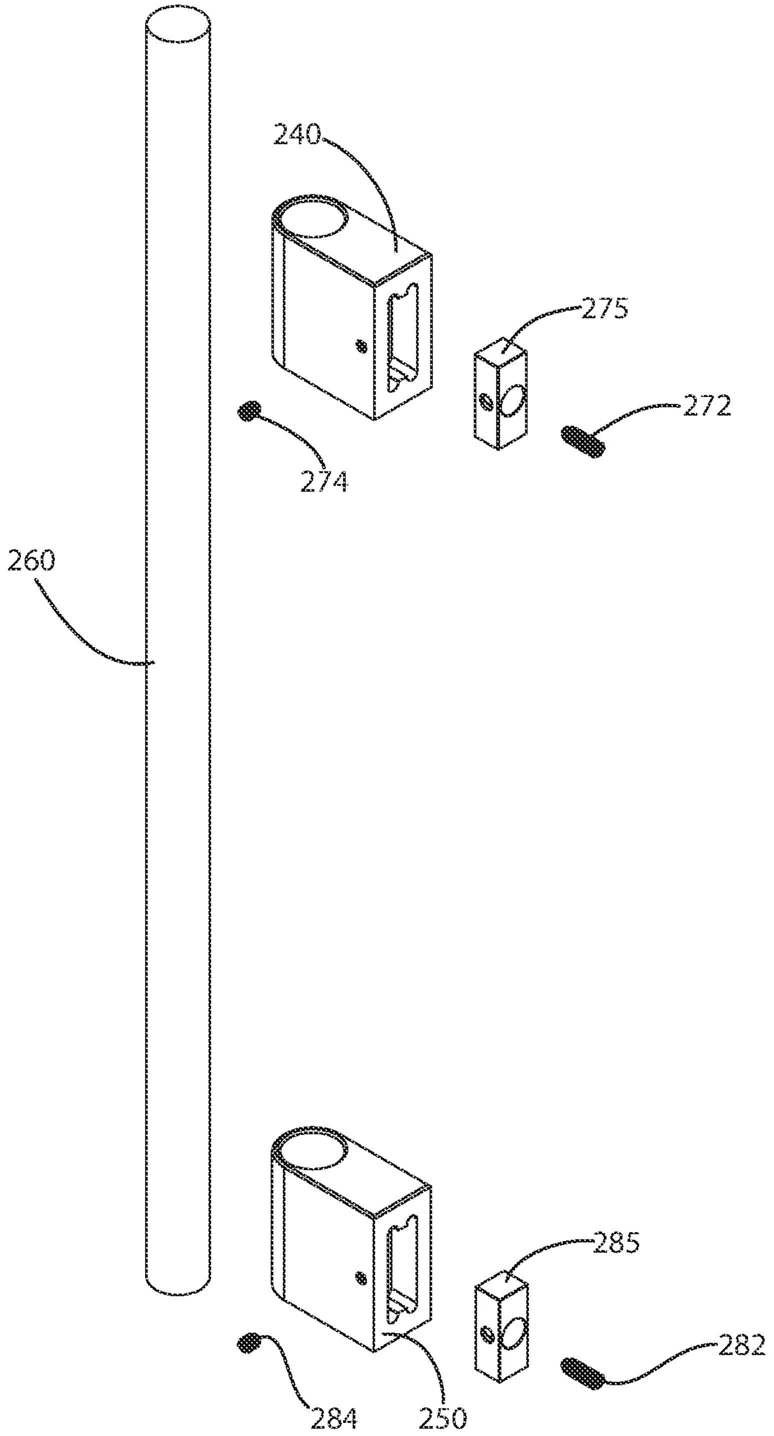
FIG. 6 is another exploded perspective view of an exemplary adjustable appliance handle according to principles of the invention.

FIG. 1 shows an exemplary appliance 100 with two exemplary adjustable appliance door handle assemblies 200, each attached to a door 105, 110, according to principles of the invention. The invention is not limited to appliances with side-by-side doors 105, 110. Instead, the invention may be adapted to appliances having any door configuration. By way of example, the invention may be adapted for use with appliances having top freezers, appliances having bottom freezers and appliances with French doors.

FIGS. 2-6 conceptually illustrate an exemplary adjustable appliance handle assembly 200 according to principles of the invention. The assembly 200 includes a bar 260 and a pair of brackets 240, 250. The brackets 240, 250 may be moved to a desired position along the length of the bar 260. At the desired position, the brackets 240, 250 may be locked in place using a set screw 272, 282, or other mechanical securing device. Each bracket 240, 250 includes an adapater 275, 285, which is used to mate with certain mounting lugs. Another set screw 274, 284 (or other mechanical securing device) secures the bracket 240, 250 to an engaged lug. While the illustrated bar 260 has a circular cross-section shape, the invention is not limited to bars having such shapes. Each bracket may be equipped with an opening sized and shaped to receive a bar with any consistent cross-section shape, such as, but not limited to, oval, polygonal (e.g., rectangular, hexagonal or octagonal), elliptical or fluted, within the scope of the invention. Bracket assemblies are described in greater detail below.

The invention provides countless stylistic options. As discussed above, the bar may have any consistent cross-section shape, such as, but not limited to, circular, oval, polygonal (e.g., rectangular, hexagonal or octagonal), elliptical or fluted. More specifically, the portions of the bar that are engaged by the brackets may have any such shapes, while the middle of the bar may have a more complex shape, such as an ergonomic shape for gripping. The bar may come in a variety of materials and finishes, such as, but not limited to, aluminum, zinc alloy, stainless steel, copper, brass, bronze, cast iron, pewter, composite, wood, plastic, glass or ceramic, with finishes such as antique, polished, satin, oil rubbed (darkened), ceramic coated or painted. The surface of the bar may be smooth or textured. The brackets may match or complement the bar.

Figure 7:
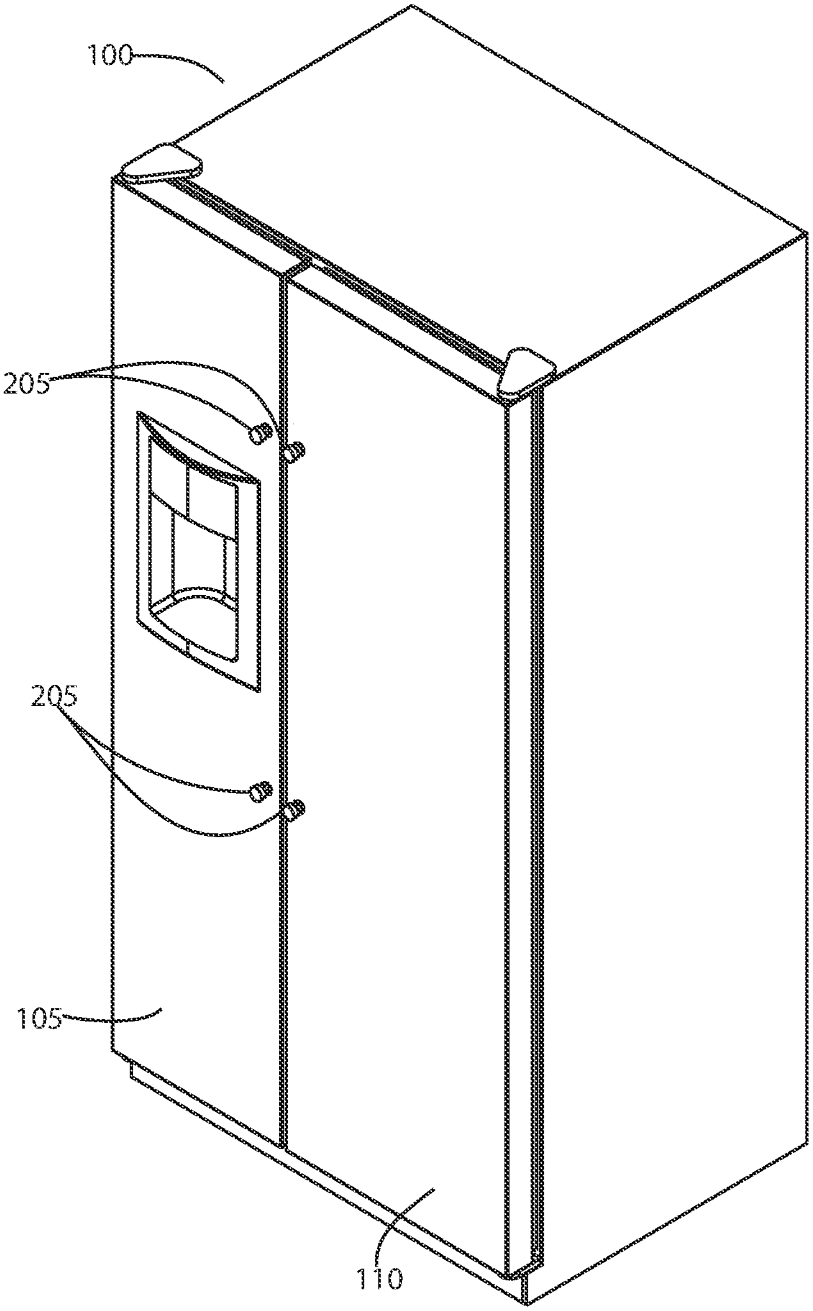
FIG. 7 is a perspective view of an exemplary appliance with handle-mounting lugs.
Figure 8:
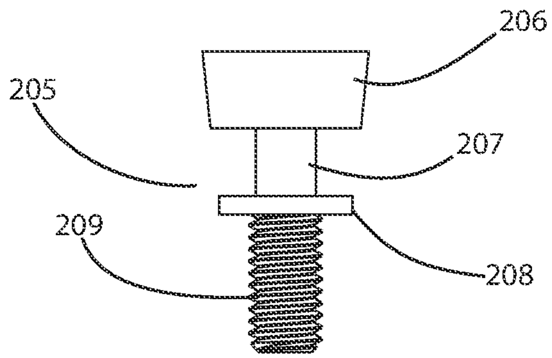
FIG. 8 is a side view of an exemplary handle-mounting lug.
Figure 9:
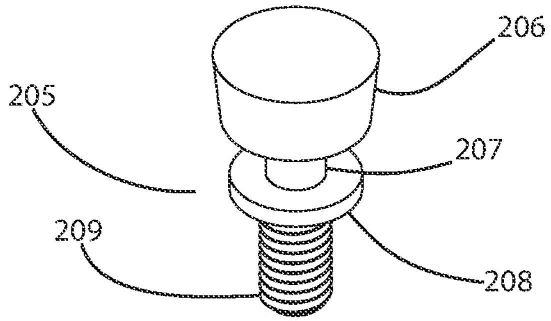
FIG. 9 is a perspective view of an exemplary handle-mounting lug.

FIG. 7 provides a perspective view of an exemplary appliance 100 with handle-mounting lugs 205. Four lugs 205, two for each handle assembly, are provided. Such lugs are typically screwed or threaded into threaded channels in the door. The lugs 205 are protrusions that are received in the bracket assembly and to which the bracket assembly is secured. As shown in FIGS. 8 and 9, the exemplary lug includes a threaded shank, an annular flange collar 208, a neck 207 and a head 206. The shank 209 is configured for threaded engagement in threaded channels in the door. The collar 208 abuts the door surface when the shank 209 is fully threaded to the door. The neck 207 exhibits a smaller outer diameter than the head 206, to provide a space for receiving the end of a set screw 274, 284 to lock the lug 205 to the bracket assembly 240, 250.

FIGS. 8 and 9 provide a nonlimiting example of a lug. Appliance door mounting lugs take many shapes. A common feature among the various shapes is that the outermost portion of the lug (i.e., the portion of the lug furthest from the door when the lug is installed) has the greatest outer width or diameter, and the intermediate portion of lug, between the outermost portion and the door, has a smaller width or diameter against which a set screw may abut to lock the lug in place relative to the bracket assembly 240, 250.

Figure 10:
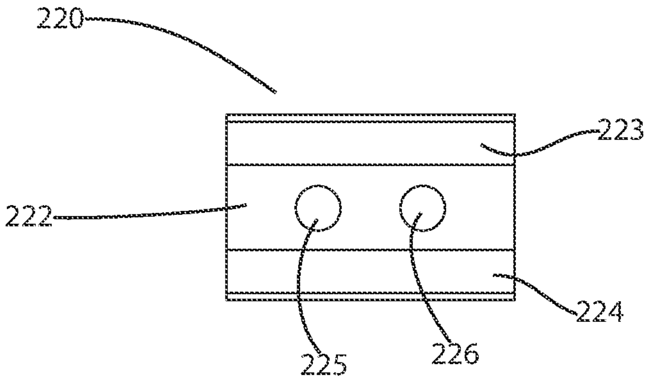
FIG. 10 is a plan view of another exemplary handle-mounting lug.
Figure 11:
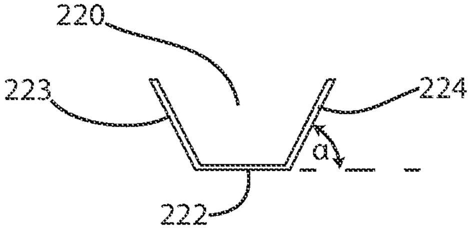
FIG. 11 is a side view of the other exemplary handle-mounting lug.
Figure 12:
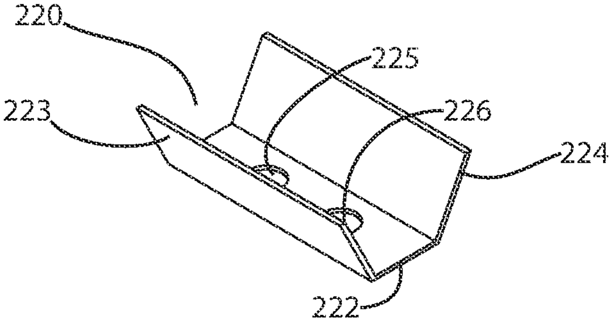
FIG. 12 is a perspective view of the other exemplary handle-mounting lug.
Figure 13:
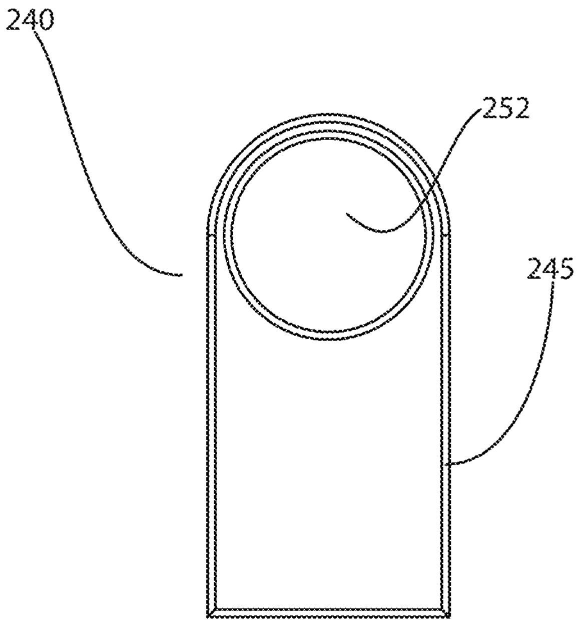
FIG. 13 is a side view of an exemplary bracket of an exemplary adjustable appliance handle according to principles of the invention.
Figure 14:
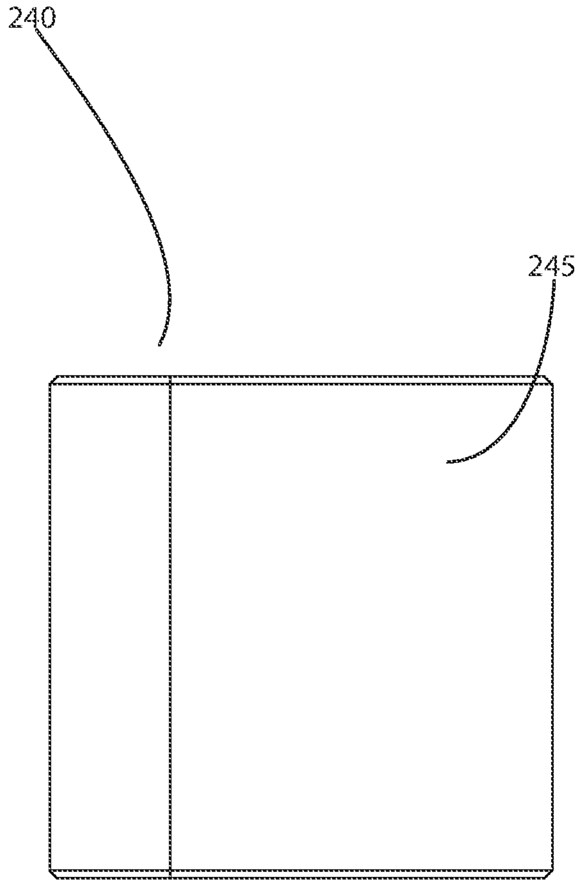
FIG. 14 is another side view of an exemplary bracket of an exemplary adjustable appliance handle according to principles of the invention.
Figure 15:
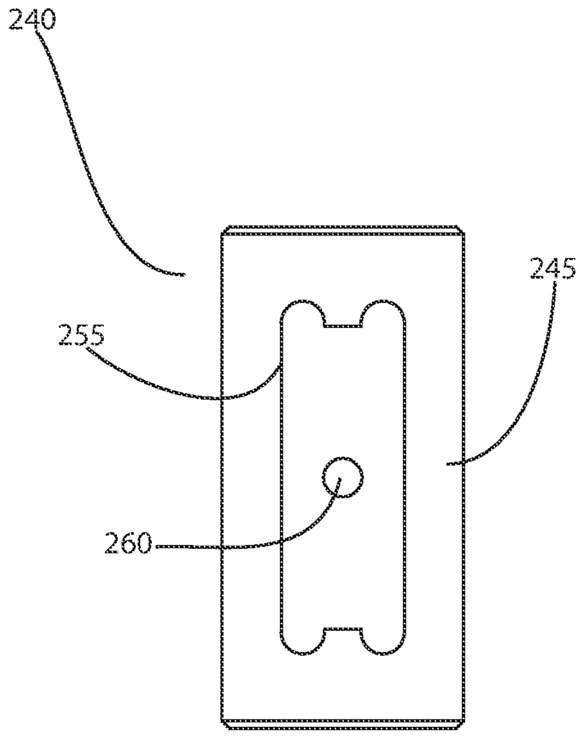
FIG. 15 is a back view of an exemplary bracket of an exemplary adjustable appliance handle according to principles of the invention.
Figure 16:
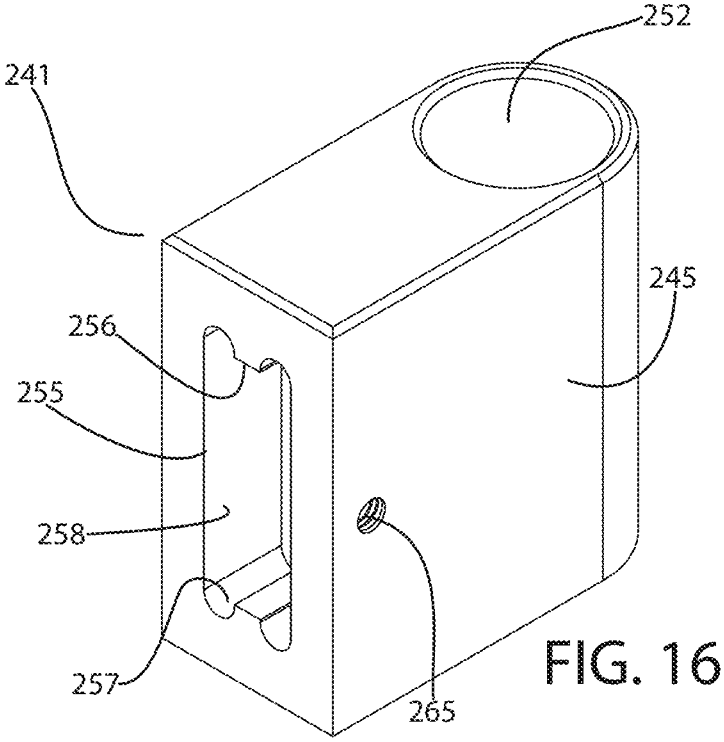
FIG. 16 is a perspective view of an exemplary bracket of an exemplary adjustable appliance handle according to principles of the invention.
Figure 17:
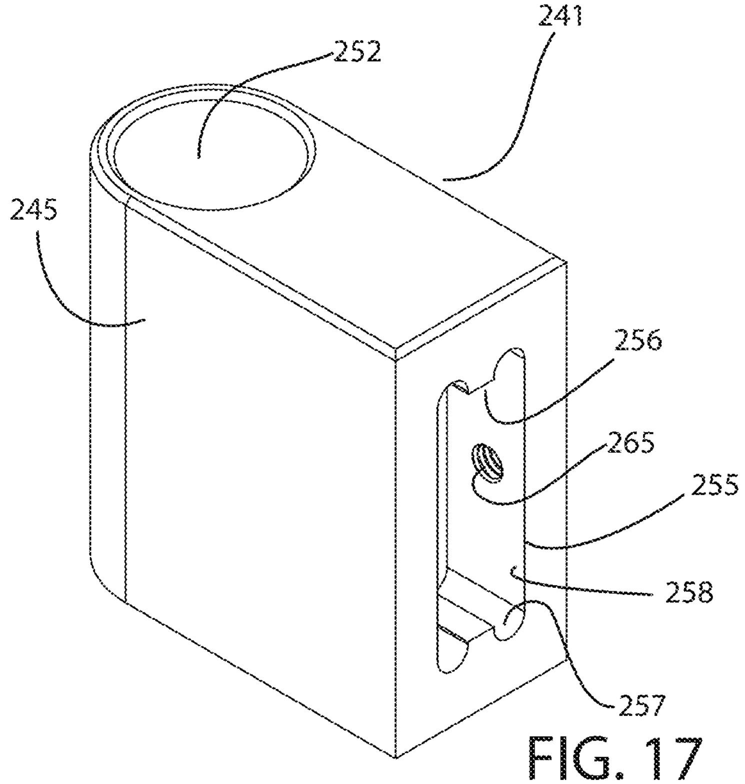
FIG. 17 is another perspective view of an exemplary bracket of an exemplary adjustable appliance handle according to principles of the invention.
Figure 18:
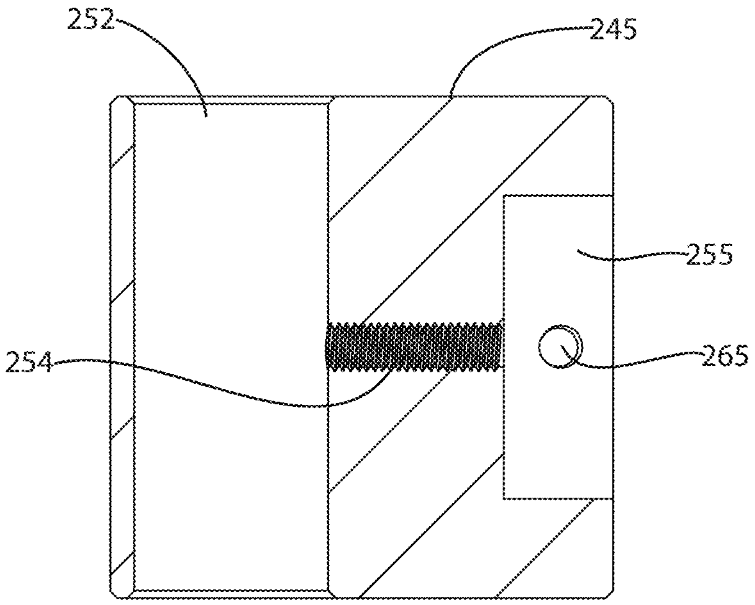
FIG. 18 is a section view of an exemplary bracket of an exemplary adjustable appliance handle according to principles of the invention.
Figure 19:
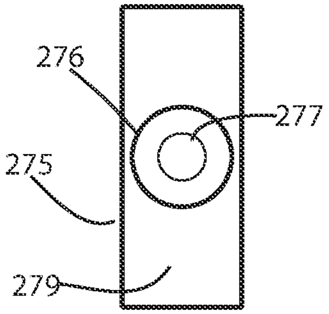
FIG. 19 is a front view of an exemplary adapter for a bracket of an exemplary adjustable appliance handle according to principles of the invention.
Figure 20:
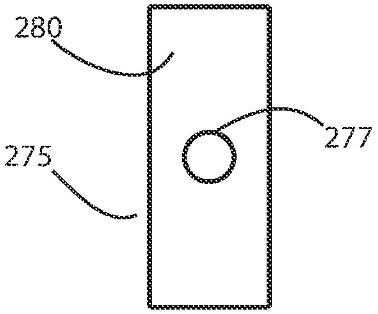
FIG. 20 is a back view of an exemplary adapter for a bracket of an exemplary adjustable appliance handle according to principles of the invention.
Figure 21:
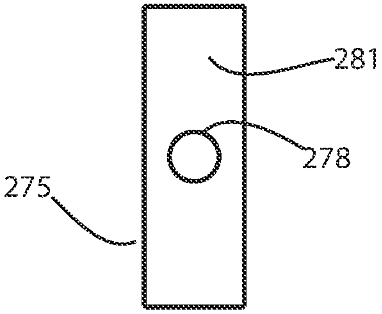
FIG. 21 is a side view of an exemplary adapter for a bracket of an exemplary adjustable appliance handle according to principles of the invention.
Figure 22:
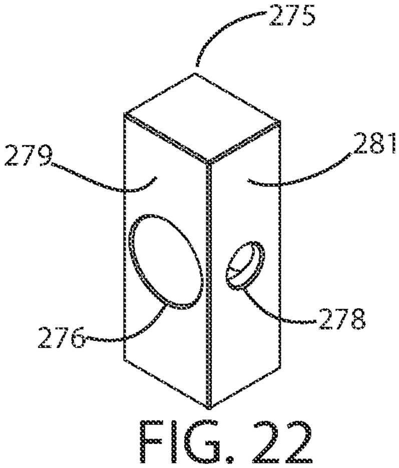
FIG. 22 is a perspective view of an exemplary adapter for a bracket of an exemplary adjustable appliance handle according to principles of the invention.
Figure 23:
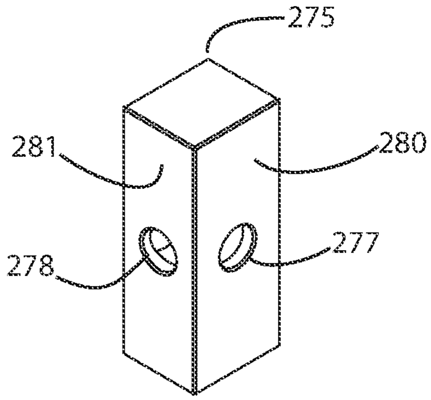
FIG. 23 is another perspective view of an exemplary adapter for a bracket of an exemplary adjustable appliance handle according to principles of the invention.

A nonlimiting example of another lug 220 is conceptually illustrated in FIGS. 10-12. This lug 220 is a bent sheet-metal structure with a rectangular base 222, a pair of mounting holes 225, 226, and a pair of opposite side flanges 223, 224. Each flange 223, 224 is bent at an acute angle, a, from the base 222. The outermost portion of the lug (i.e., the portion of the lug furthest from the base 222) has the greatest outer width (distance from side to side), and the intermediate portion of lug, between the outermost portion and the base

222, has a smaller width against which a set screw may abut to lock the lug in place relative to the bracket assembly 240, 250.

FIGS. 13-18 conceptually illustrate an exemplary bracket 241 of a bracket assembly 240 for an exemplary adjustable appliance handle according to principles of the invention. The bracket 241 includes a body 245, channel 252 that extends through the body and receives a portion of the bar 260, and a primary compartment 255 that is formed in the body 245 and receives an adapter 275 and/or a lug 205, 220. The body 245 has an aesthetically pleasing shape, such as, but not limited to, a semicircular arch cross-section shape extending from parallel sidewalls. The primary compartment 255 includes a pair of spaced apart side walls 258, and a pair of spaced apart 3-shaped walls orthogonal to side walls 258. The 3-shaped walls include arched segments 257 separated by intermediate mesas 256.

The channel 252 has a constant cross-section shape and size. The channel 252 extends through the body 245. The channel 252 is sized and shaped to receive a portion of the bar 260. As the size (e.g., diameter) of the channel 252 is slightly larger than the size (e.g., diameter) of the bar 260, the bar 260 may be slid into the channel 252. A threaded channel 254 for a set screw extends from the primary compartment 255 to the bar channel 252. A set screw 272 (FIGS. 24 & 25) threaded into the threaded channel 254 secures a received portion of the bar 260 in the bar channel 252. Loosening the set screw 272 in the threaded channel 254 frees the bar 260, allowing movement of the bar 260 relative to the channel 252. Tightening the set screw 272 in the threaded channel 254 against the bar 260, restrains the bar 260 from moving relative to the channel 252.

The primary compartment 255 is sized and shaped to receives an adapter 275 (FIGS. 19-23) and/or a lug 205, 220. Without the adapter, the primary compartment 255 is sized and shaped to receive lugs that have a generally rectangular footprint, such as the lug 220 shown in FIGS. 10-12. The adapter 275 occupies the primary compartment 255 and provides a smaller lug compartment 276 for receiving a smaller lug, such as the lug 205 of FIGS. 7-9.

A threaded channel 265 for a set screw extends from a sidewall of the bracket 241 to the primary compartment 255. A set screw 274 (FIGS. 24 & 25) threaded into the threaded channel 265 secures a received lug in the primary compartment 255, or in the secondary compartment 276 of the adapter 275. Loosening the set screw 274 in the threaded channel 265 frees the adapter 275 and/or the lug, allowing removal of the adapter and/or lug from the primary compartment 255. Tightening the set screw 274 in the threaded channel 265 against the lug, restrains the adapter 275 and/or lug from moving relative to the compartment 276.

FIGS. 27-30 and 31-34 conceptually illustrate additional exemplary brackets 300, 350 according to principles of the invention. Dimensions are provided as nonlimiting examples of suitable dimensions. Each bracket 300, 350 includes a shaft 315, 365. The shaft 315, 365 extends from a cap 305, 355, which may be a disk-shaped structure or another decorative shape. A central bore 320, 370 is provided in the free end of the shaft 315, 365. The bore 320, 370 is sized and shaped to receive a mounting lug. The cap 305, 355 is exposed to a user. A transverse hole 310, 360 extends through the shaft 315, 365. The transverse hole 310, 360 is a through channel that is located between the cap 305, 355 and the inner end of the bore 320, 370. A bar extends through the transverse hole 310, 360 when the bracket is in use as a component of a handle. A threaded hole is formed through the inner end of the bore 320, 370 to the transverse hole 310, 360. A set screw threaded through the threaded hole secures a bar in the transverse hole 310, 360. One or more brackets 300, 350 may be secured to a bar at relative locations along the length of the bar to accommodate an appliance and its existing mounting hardware. A mounting lug is received in the central bore 320, 370. To secure the mounting lug in place in the central bore 320, 370, a set screw is threaded into the transverse threaded hole 325, 375 that intersects the central bore 320, 370.

In use, the bracket 300, 350 is slid onto a bar, with the bar extending through the transverse hole 310, 360. When the bracket is at the correct location for mounting relative to the bar, a set screw is threaded through the interior threaded hole to secure the bracket 300, 350 in relation to the bar. Then, a mounting lug of an appliance is received in the central bore 320, 370. Then, a set screw is threaded into the transverse threaded hole 325, 375, to secure the mounting lug within the central bore 320, 370.

The central bore may be sized to receive an adapter. An adapter engages both a mounting lug and the central bore or a similar compartment. Once an adapter is fixed to a mounting lug, the adapter may be secured in a bore or compartment of a bracket. Using adapters allows a bore or compartment to mate with mounting lugs of various configurations and sizes.

In one embodiment, an adapter 275 fits within the primary compartment 255 to provide a secondary aperture (i.e., opening) and compartment for engaging a lug that is smaller than the largest lug that fits in the primary compartment. The secondary compartment has an opening that is sized and shaped to receive a lug that is smaller than a lug that the primary compartment is designed (i.e., shaped and sized) to receive without an adapter. A bracket according to principles of the invention may include a plurality of adapters, including one adapter for each of a plurality of different sized and/or shaped lugs.

An exemplary adapter 275, as shown in FIGS. 19-23, is a hollow rectangular cuboid, with 6 side walls and 3 apertures. One side wall 279 includes a primary aperture 276 for receiving the head 206 of a lug 205. The opposite side wall 280 (side opposite to side wall 279) includes a hole 277 for accessing the set screw 272 in the threaded channel 254. An Allen wrench may extend through the hole 277 to tighten, loosen or remove the set screw 272 in the threaded channel 254. A side wall 281, orthogonal to side walls 279 and 280, includes another access hole 278 for receiving a tip of a set screw 274 from the threaded channel 265. The tip of the set screw 274 extends through the access hole 278 to about a lug 205. Optionally, the access hole 278 may be threaded to threadedly receive the set screw 274.

Figure 35:
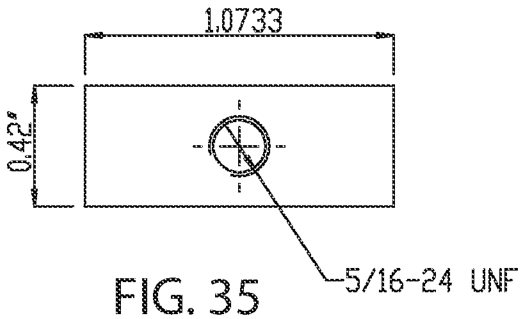
FIG. 35 is a first side view of an exemplary adapter for a bracket of an exemplary adjustable appliance handle according to principles of the invention.
Figure 36:
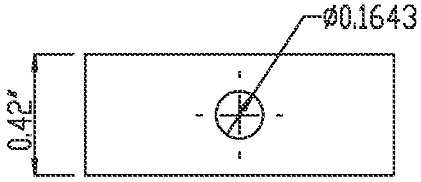
FIG. 36 is a second side view of an exemplary adapter for a bracket of an exemplary adjustable appliance handle according to principles of the invention.
Figure 37:
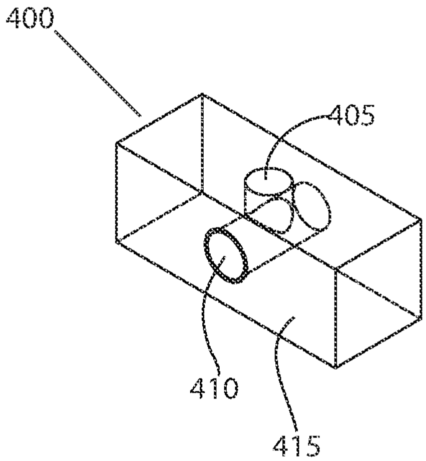
FIG. 37 is a perspective view of an exemplary adapter for a bracket of an exemplary adjustable appliance handle according to principles of the invention.

FIGS. 35-37 conceptually illustrate another adapter. Dimensions are provided as nonlimiting examples. The adapter 400 includes a body 415, which may be a rectangular solid polyhedron, with a transverse through bore 410 that extends from one side to an opposite side, and a threaded bore 405 for a set screw. The threaded bore 405 extends along an axis that is parallel to the longitudinal axis of the transverse through bore 410. The threaded bore 405 intersects the transverse through bore 410. A mounting lug is received in the transverse through bore 410. A set screw threaded into threaded bore 405 secures the adapter to the mounting lug.

In some embodiments, an adapter according to principles of the invention may be mounted to a surface (e.g., a door surface) using mechanical fasteners. A bracket assembly may then engage the mounted adapter, as described herein. By way of example and not limitation, the through bore 410 may be threaded. A threaded shank of a machine screw or bolt may extend through a door, with the head of the screw or bolt on the inner side of the door. The screw or bolt may be threaded into the threaded through bore 410, to secure the adapter to the door. As another example, the bore 410 may include a counterbore at one end. The head of a bolt or screw or a nut may reside in the counterbore. Washers, including flat and lock washers may be used with any such screws and bolts. As yet another example, lugs may be mounted to a door that did not originally come equipped with lugs. The lugs may be screwed or bolted to the door. The bore 410 of the adapter may then receive the lug for mounting.

Figure 24:
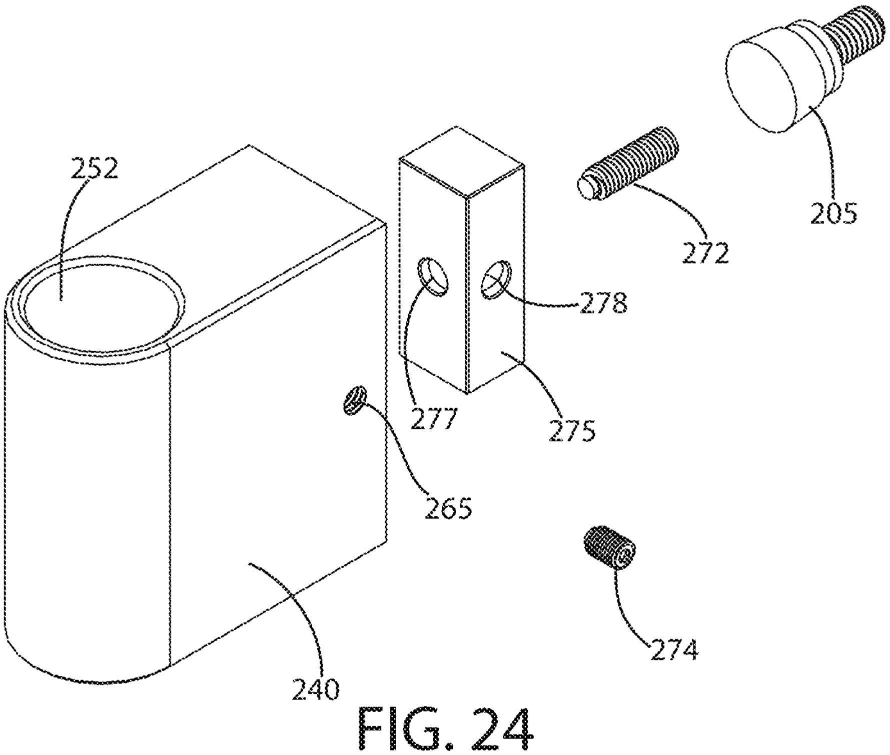
FIG. 24 is an exploded perspective view of an exemplary bracket assembly for an exemplary adjustable appliance handle according to principles of the invention.
Figure 25:
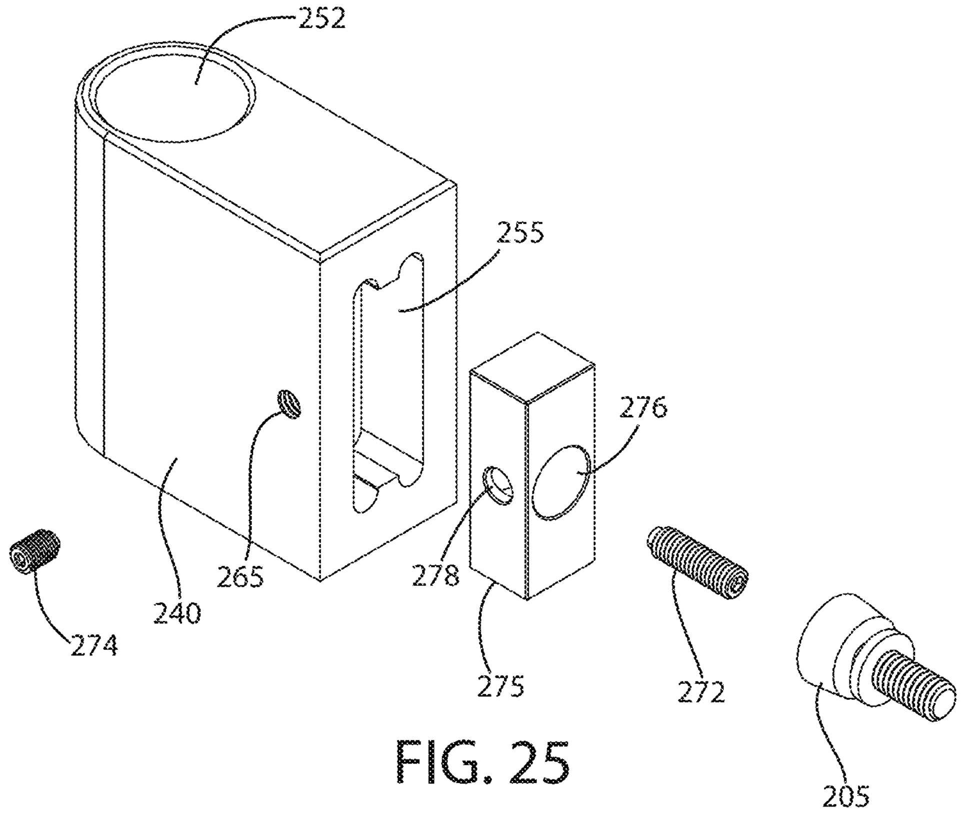
FIG. 25 is an exploded perspective view of an exemplary bracket assembly for an exemplary adjustable appliance handle according to principles of the invention.
Figure 26:
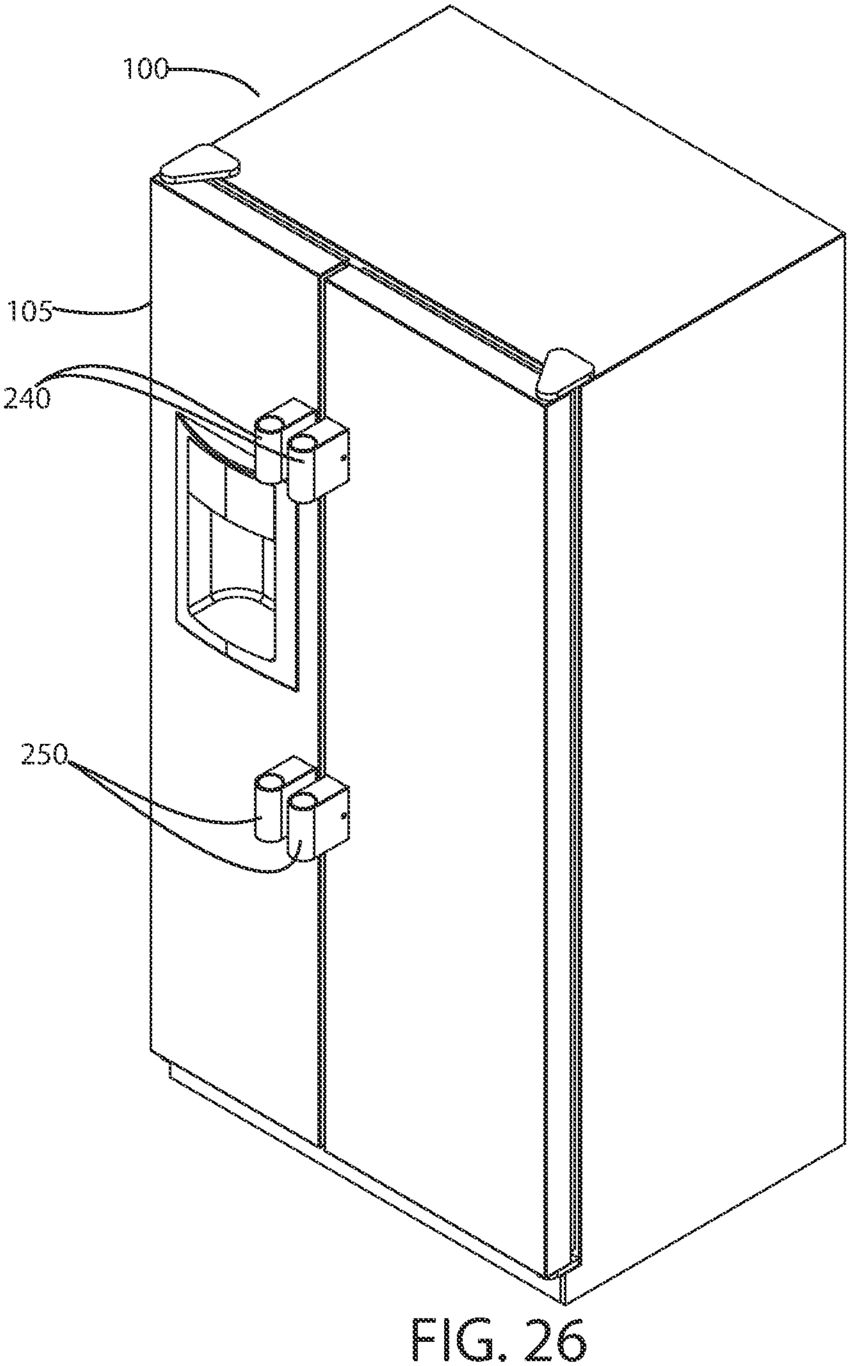
FIG. 26 is a perspective view of an exemplary appliance with exemplary bracket assemblies for adjustable appliance handles according to principles of the invention.
Figure 27:
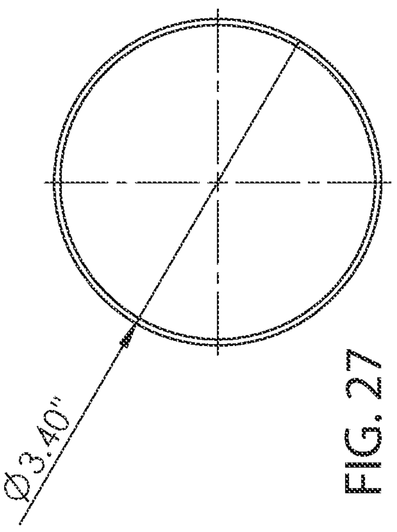
FIG. 27 is a plan view of an exemplary bracket of an exemplary adjustable appliance handle according to principles of the invention.
Figure 28:
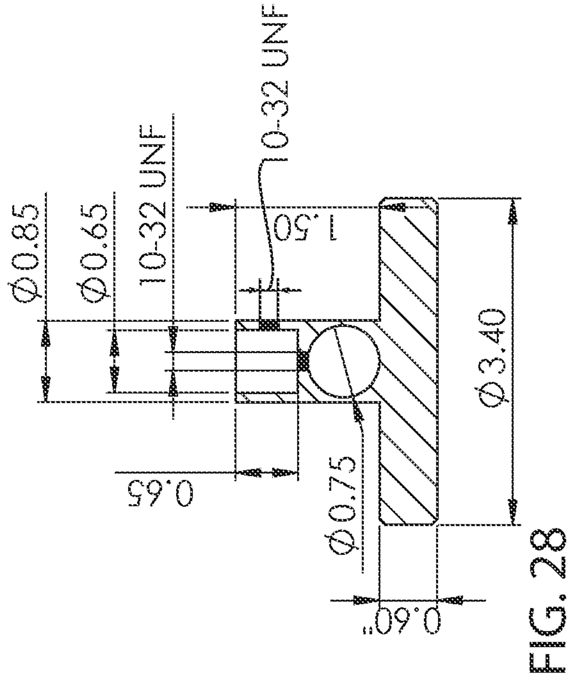
FIG. 28 is a section view of an exemplary bracket of an exemplary adjustable appliance handle according to principles of the invention.
Figure 29:
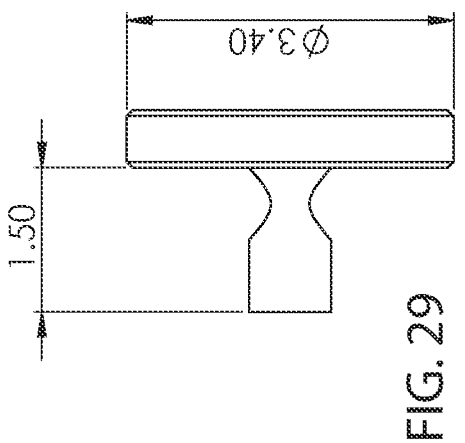
FIG. 29 is a side view of an exemplary bracket of an exemplary adjustable appliance handle according to principles of the invention.
Figure 30:
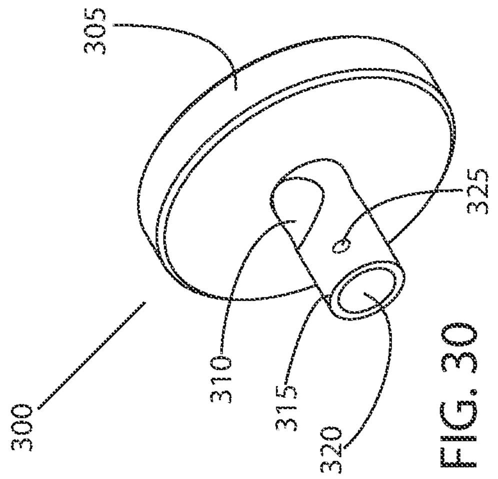
FIG. 30 is a perspective view of an exemplary bracket of an exemplary adjustable appliance handle according to principles of the invention.
Figure 33:
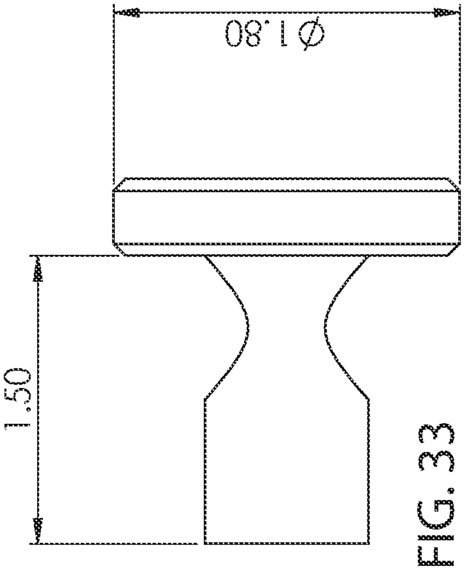
FIG. 33 is a side view of an exemplary bracket of an exemplary adjustable appliance handle according to principles of the invention.
Figure 34:
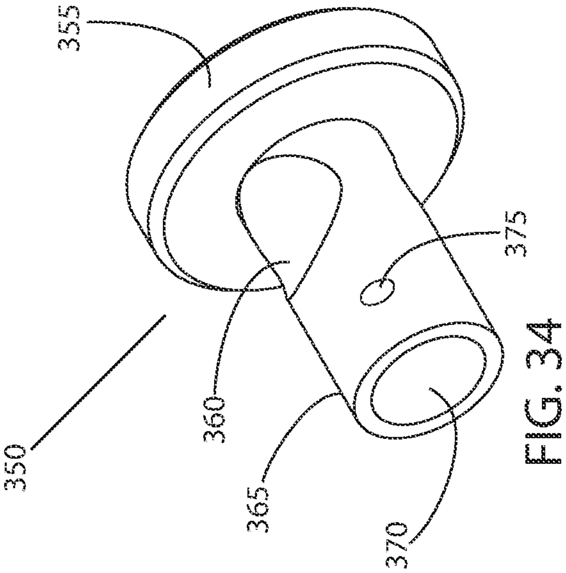
FIG. 34 is a perspective view of an exemplary bracket of an exemplary adjustable appliance handle according to principles of the invention.
Figure 31:
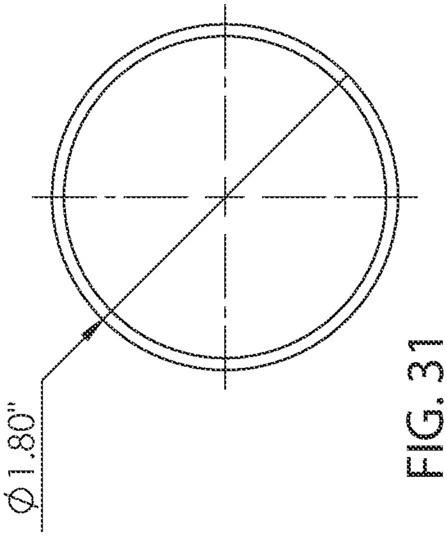
FIG. 31 is a plan view of an exemplary bracket of an exemplary adjustable appliance handle according to principles of the invention.
Figure 32:
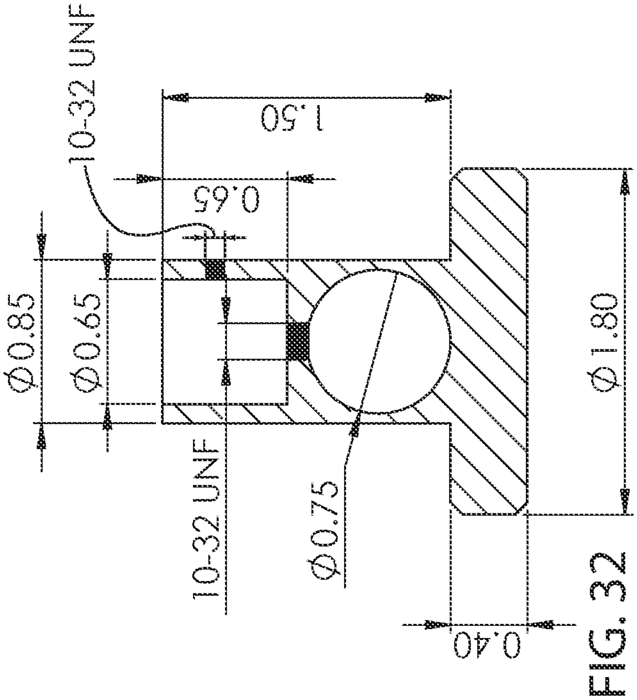
FIG. 32 is a section view of an exemplary bracket of an exemplary adjustable appliance handle according to principles of the invention.

Exploded perspective views of an exemplary bracket assembly are provided in FIGS. 24 and 25. The set screw 272 for retaining the bar 260 may be threaded into channel 254, without installing the adapter 275, or before or after the adapter 275 is installed in the primary compartment 255. If the adapter 275 is used, set screw 274 may be threaded into channel 265 after the adapter 275 is installed, and after the lug 205 is received through the opening 276 into the secondary compartment of the adapter 275. If the adapter 275 is not used, set screw 274 may be threaded into channel 265 after the lug 220 is received in the primary compartment 255 of the bracket 241.

The invention provides a handle assembly with bracket assemblies for engaging appliance door mounting lugs. The handle assembly includes a bar that is at least as long as the distance between a pair of lugs to which the handle assembly will be attached. The bracket assemblies may be fixed to the bar at appropriate positions along the length of the bar for engaging the lugs. The lugs may be received in primary compartments of the bracket assemblies, or in secondary compartments of adapters inserted into the primary compartments. A set screw secures each bracket assembly to the bar. Another set screw secures each lug in the primary or secondary compartment.

Figure 38:
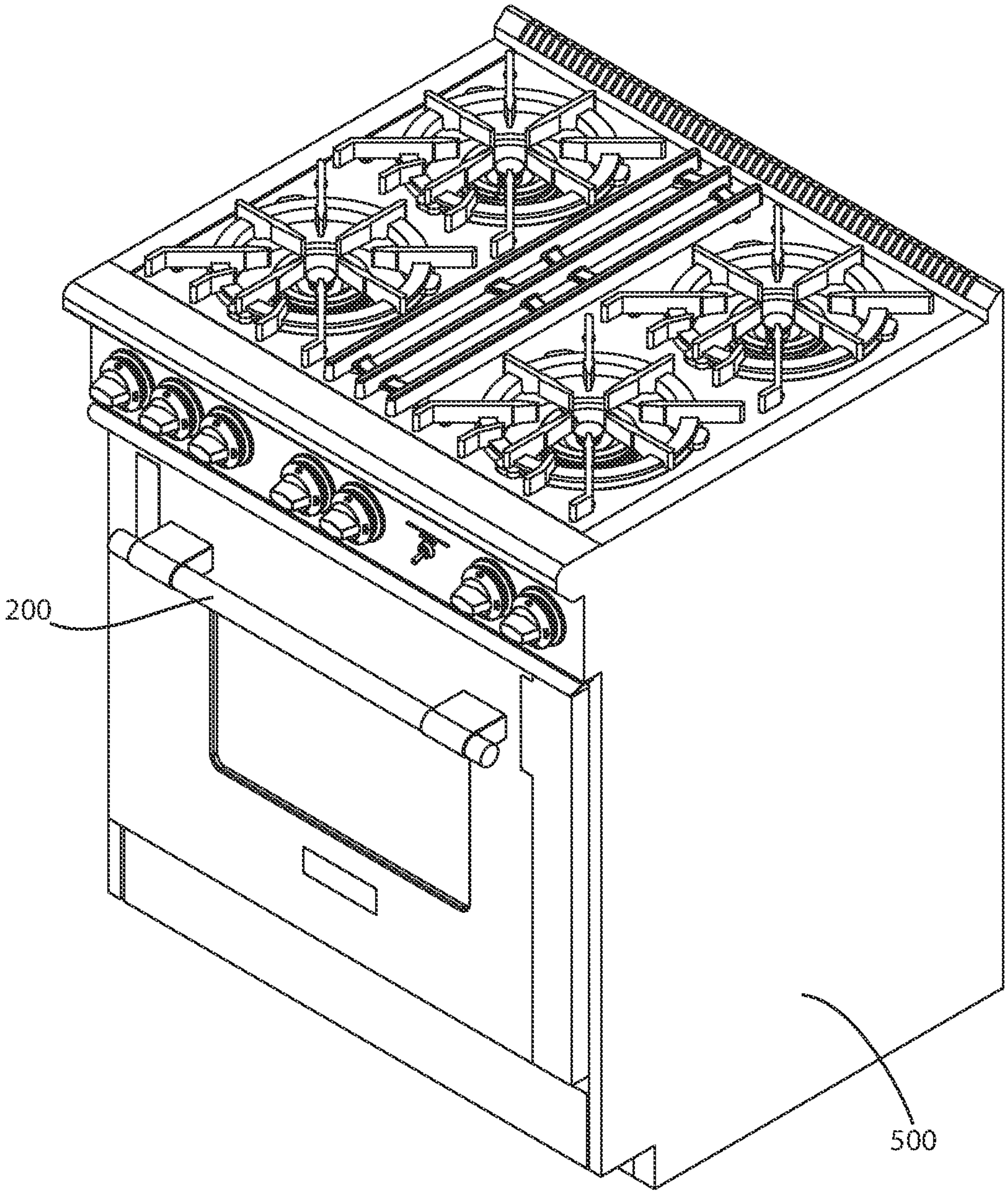
FIG. 38 is a perspective view of an exemplary range with an exemplary adjustable appliance handle according to principles of the invention.
Figure 39:
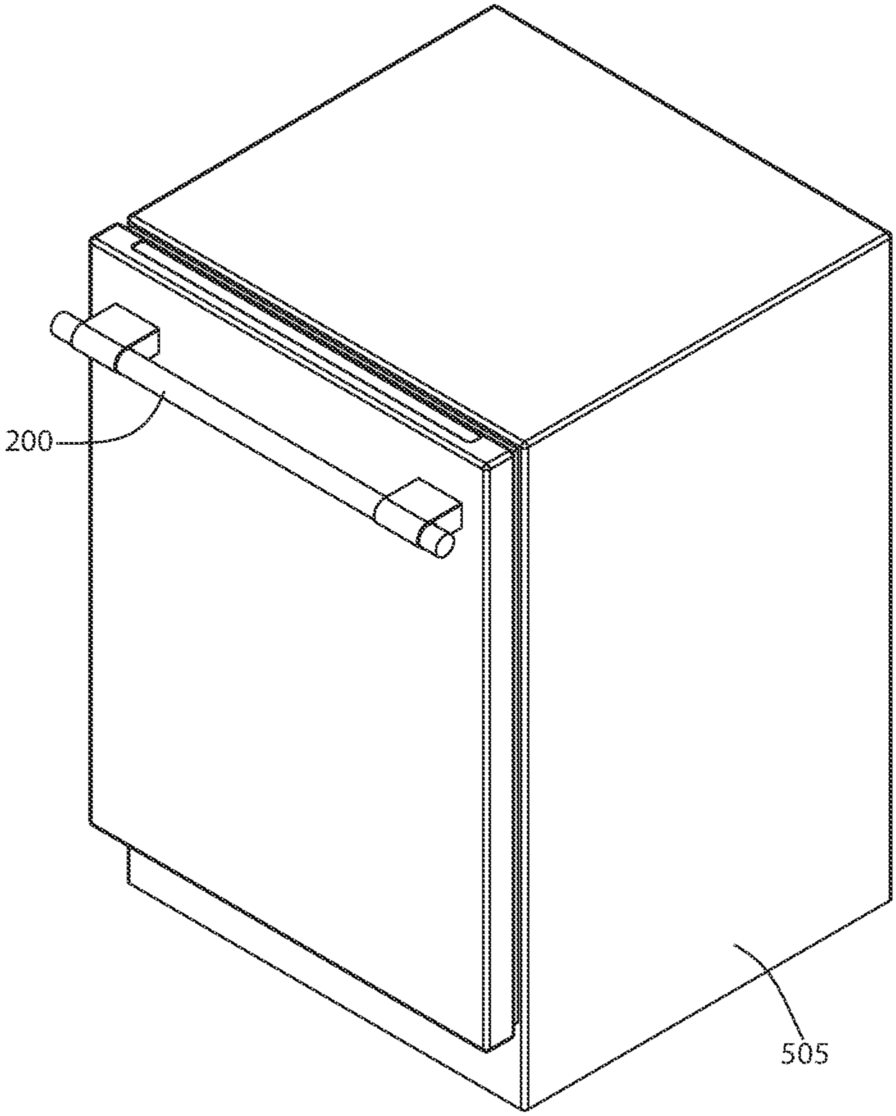
FIG. 39 is a perspective view of an exemplary dishwasher with an exemplary adjustable appliance handle according to principles of the invention.

The principles of the invention are not limited to handles for refrigerator doors. A handle according to principles of the invention is resizable and scalable (i.e., may be scaled up in size, scaled down in size, and may be made with different proportions) and may be applied to devices other than refrigerators. By way of example and not limitation, a handle according to principles of the invention may be sized for application to drawers and cabinet doors of a kitchen, to other appliances such as ovens (i.e., to oven doors) and to any surface that requires a handle and to which handle mounting lugs may be attached. Illustratively, FIGS. 38 and 39 conceptually illustrate handle assemblies 200 according to principles of the invention attached to a door of a range 500 and a door of a dishwasher 505.

Any dimensions, amounts or concentrations are provided as approximations for a particular embodiment, unless expressly stated otherwise. Claims are not limited to dimensions, unless expressly set forth in a claim. Dimensions, amounts or concentrations, if any, recited in a claim, may be varied without departing from the scope of the invention. Varied dimensions, amounts or concentrations that do not substantially impair utility of the invention are intended to come within the spirit and scope of the invention. About, when used with an amount or dimension, encompasses a range that does not substantially impair utility of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An adjustable handle comprising:

a bar, the bar being elongate, the bar having a first section extending from a first end of the bar, and a second section extending from a second section of the bar, the first section and the second section having a same cross-sectional shape and size;

at least one bracket, each bracket of the at least one bracket including a body;

a bar channel extending through the body of the bracket from a first side of the body to an opposite second side of the body, the bar channel being sized and shaped to receive a portion of one of the first section and the second section of the bar, and the bar being movable through the bar channel and relative to the body of the bracket;

a mounting compartment, the mounting compartment comprising a cavity accessible from a mounting compartment aperture in a third side of the body of the bracket;

an adapter, the adapter comprising a structure sized and shaped to be engaged within and removable from the mounting compartment, the adapter receiving and being mechanically attached to a door-mounted attachment, the door-mounted attachment being a door-mounted lug; and a first threaded channel extending from a side of the body, through the body, to the cavity accessible from the mounting compartment aperture in the third side of the body, and a first set screw threadedly received in the first threaded channel, the first set screw being configured to secure the bracket to the adapter when a portion of the set screw extends into the cavity accessible from the mounting compartment aperture in the third side of the body.

2. The adjustable handle of claim 1, each bracket of the at least one bracket further including a second threaded channel extending from the cavity accessible from the mounting compartment aperture accessible from the mounting compartment aperture in the third side of the body, through the body, to the bar channel, and a second set screw threadedly received in the second threaded channel, the second set screw being configured to secure the bracket to the bar when a portion of the second set screw extends into the bar channel.

3. The adjustable handle of claim 2, the adapter including a first access aperture aligned with a secondary aperture and the second threaded channel when the adapter is engaged within the mounting compartment.

4. The adjustable handle of claim 3, the secondary aperture being circular in cross-section shape.

5. The adjustable handle of claim 1, the adapter including a second access aperture aligned with the first threaded channel when the adapter is engaged within the mounting compartment.

6. The adjustable handle of claim 1, the structure of the adapter comprising a rectangular cuboid.

7. The adjustable handle of claim 6, the structure of the adapter being formed from bent sheet metal.

8. The adjustable handle of claim 6, the structure of the adapter being hollow.

9. An adjustable door handle attached to door-mounted lugs protruding from a door, the adjustable door handle comprising:

a bar, the bar being elongate, the bar having a first section extending from a first end of the bar, and a second section extending from a second section of the bar, the first section and the second section having a same cross-sectional shape and size;

two brackets, each bracket of the two brackets including a body, a bar channel extending through the body from a first side of the body to an opposite second side of the body, the bar channel being sized and shaped to receive a portion of one of the first section and the second section of the bar, and the bar being movable through the bar channel and relative to the body of the bracket, a mounting compartment, the mounting compartment comprising a cavity accessible from a mounting compartment aperture in a third side of the body of the bracket, the mounting compartment being shaped and sized to engage one of a pair of door-mounted lugs protruding from a door;

a first threaded channel extending from a side of the body, through the body, to the cavity accessible from the mounting compartment aperture in the third side of the body, and a first set screw threadedly received in the first threaded channel, the first set screw securing the bracket to a lug of the pair of door-mounted lugs protruding from a door, a portion of the first set screw extend into the cavity accessible from the mounting compartment aperture in the third side of the body and abutting the lug.

10. The adjustable door handle attached to a pair of door-mounted lugs protruding from a door, of claim 9, the bar having a circular cross-section shape.

11. The adjustable door handle attached to a pair of door-mounted lugs protruding from a door of claim 9, each bracket of the two brackets further including a second threaded channel extending from the cavity accessible from the mounting compartment aperture in the third side of the body, through the body, to the bar channel, and a second set screw threadedly received in the first threaded channel, the first set screw securing the bracket to the bar, a portion of the second set screw extending into the bar channel and abutting the bar.

12. An adjustable door handle attached to at least one door-mounted lugs protruding from a door, the adjustable door handle comprising:

a bar, the bar being elongate, the bar having a first section extending from a first end of the bar, and a second section extending from a second section of the bar, the first section and the second section having a same cross-sectional shape and size;

at least one bracket, each bracket of the at least one bracket including a body, a bar channel extending through the body from a first side of the body to an opposite second side of the body, the bar channel being sized and shaped to receive a portion of one of the first section and the second section of the bar, and the bar being movable through the bar channel and relative to the body of the bracket, a mounting compartment, the mounting compartment comprising a cavity in a third side of the body of the bracket, the mounting compartment being shaped and sized to engage a first type of door handle mounting lug, and an adapter engaged within the mounting compartment, the adapter comprising a rectangular cuboid structure and including a lug compartment with a secondary aperture for receiving and engaging a second type of door handle mounting lug, the second type of door handle mounting lug having a size that is different from a size of the first type of door handle mounting lug, each lug of the at least one door-mounted lug protruding from the door being the second type of door handle mounting lug and, a portion of the lug being received into the lug compartment.

13. The adjustable door handle attached of claim 12, the bar having a circular cross-section shape.

14. The adjustable door handle of claim 12, each bracket of the at least one bracket further including a second threaded channel extending from the cavity accessible from the mounting compartment aperture in the third side of the body, through the body, to the bar channel, and a second set screw threadedly received in the second threaded channel, the second set screw securing the bracket to the bar, a portion of the set screw extends into the bar channel and abutting the bar.

15. The adjustable door handle of claim 14, the adapter including a first access aperture aligned with the secondary aperture and the second threaded channel.

16. The adjustable door handle of claim 12, each bracket of the at least one bracket further including a first threaded channel extending from a side of the body, through the body, to the cavity accessible from the mounting compartment aperture in the third side of the body, and a first set screw threadedly received in the first threaded channel, the first set screw securing the bracket to and abutting the portion of the lug received through the secondary aperture into the lug compartment.

17. The adjustable door handle of claim 16, the adapter including a first access aperture aligned with the secondary aperture and the first second threaded channel, and a second access aperture aligned with the first threaded channel.

* * * * *